(12) United States Patent
Syed-Ebrahim et al.

(10) Patent No.: US 10,380,370 B2
(45) Date of Patent: Aug. 13, 2019

(54) COLUMN WISE ENCRYPTION FOR LIGHTWEIGHT DB ENGINE

(71) Applicant: Samsung Electronics Co., Ltd., Suwon-si, Gyeonggi-do (KR)

(72) Inventors: Abdul Syed-Ebrahim, Mountain View, CA (US); Peng Ning, Mountain View, CA (US); Ken Chen, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 15/053,250

(22) Filed: Feb. 25, 2016

(65) Prior Publication Data

US 2017/0083604 A1  Mar. 23, 2017

Related U.S. Application Data

(60) Provisional application No. 62/126,091, filed on Feb. 27, 2015, provisional application No. 62/126,058, filed on Feb. 27, 2015.

(51) Int. Cl.
*G06F 21/62* (2013.01)
*G06F 16/245* (2019.01)

(52) U.S. Cl.
CPC ........ *G06F 21/6227* (2013.01); *G06F 16/245* (2019.01); *G06F 2221/2107* (2013.01)

(58) Field of Classification Search
CPC .............................. G06F 21/00; G06F 21/6227
See application file for complete search history.

(56) References Cited

U.S. PATENT DOCUMENTS

| | | | |
|---|---|---|---|
| 8,949,603 B2 | 2/2015 | Moon | |
| 2004/0172538 A1* | 9/2004 | Satoh | G06F 21/80 713/175 |
| 2004/0255133 A1* | 12/2004 | Lei | G06F 21/6227 713/193 |
| 2006/0053112 A1* | 3/2006 | Chitkara | G06F 17/30595 |
| 2008/0097954 A1 | 4/2008 | Dutta et al. | |
| 2008/0133935 A1* | 6/2008 | Elovici | G06F 21/6227 713/193 |
| 2010/0191959 A1* | 7/2010 | Czajkowski | G06F 21/14 713/155 |
| 2013/0031375 A1* | 1/2013 | Lin | G06F 21/44 713/192 |
| 2016/0070589 A1* | 3/2016 | Vermeulen | G06F 9/466 711/153 |

* cited by examiner

*Primary Examiner* — Fatoumata Traore
(74) *Attorney, Agent, or Firm* — Jefferson IP Law, LLP

(57) ABSTRACT

An apparatus and method for operating a relational database (DB) are provided. The method includes determining a sensitivity classification for a column of a table in the DB, performing encryption, using a data encryption key (DEK), of sensitive data when writing the sensitive data to the column determined to be sensitive, performing decryption, using the DEK, of the encrypted sensitive data when reading the sensitive data from the column determined to be sensitive, and performing writing to the column and reading from the column of unencrypted non-sensitive data when the column is determined to be non-sensitive.

22 Claims, 12 Drawing Sheets

COLUMN WISE ENCRYPTION FOR LIGHTWEIGHT DB ENGINE

CROSS-REFERENCE TO RELATED APPLICATION(S)

This application claims the benefit under 35 U.S.C. § 119(e) of a U.S. Provisional application filed on Feb. 27, 2015, in the U.S. Patent and Trademark Office and assigned Ser. No. 62/126,091, and a U.S. Provisional application filed on Feb. 27, 2015, in the U.S. Patent and Trademark Office and assigned Ser. No. 62/126,058, the entire disclosure of each of which is hereby incorporated by reference.

TECHNICAL FIELD

The present disclosure relates to an apparatus and method for a column wise database (DB) encryption. More particularly, the present disclosure relates to an apparatus and method for seamlessly integrating encrypted sensitive data in sensitive columns and unencrypted non-sensitive data in non-sensitive columns in a same relational database.

BACKGROUND

Devices require support for storing sensitive data in databases (DBs) in order to meet higher security requirements. By definition, sensitive data is data that is available for usage in a state where the database user has furnished the master key to the database engine. In order to enable sensitive data in the database, applications require databases to support column wise encryption and databases require applications to configure the sensitive columns of the managed tables. Applications that gain higher security, shall also benefit from seamless co-existence of sensitive and non-sensitive data in the database without compromising on the original capability of the database engine.

Databases are prone to software upgrades for different sensitive column encoders during a device lifecycle requiring the accessing device to also be updated. Porting encrypted data from one encoder to a different encoder has heretofore been a cumbersome process of decrypting the entire database using a first encoder, re-encrypting the database with a second encoder, and writing the re-encrypted data.

A typical DB engine uses a lighter structured query language (SQL) Engine, for example, SQLite.

An SQL Engine is built using different layers. SQLite has 4 main layers:
  SQL Statement Processing Layer (SQLite application program interface (API) Layer).
  Byte Code Processing Layer (virtual data base engine (VDBE) Layer).
  Record Processing Layer (balanced tree (BTree) Layer).
  Page Processing Layer (Pager Layer).

The SQLite API understands the SQL statement and converts the information into SQLite's operational codes. VDBE uses the operational codes to fetch required data from the Btree layer and processes the data and returns the results to the higher layers. The Btree Layer understands the table structure and deals at the level of records. The Pager fetches pages from the DB file, caches, and shares that to the higher layers.

Current mobile terminals use SQLite predominantly to fulfil the need for a SQL DB Engine due to its lighter weight. SQLite currently supports only database file wide confidentiality and integrity.

There is thus a need for Mobile Devices to support storing sensitive data in the database to meet higher security requirements. These Enterprise Applications demand the co-existence of sensitive and non-sensitive data within the same Database. There is further a need to support the co-existence of sensitive and non-sensitive data not only within the same database, but even within a single table, so that the whole Database design then may avoid being unnecessarily complicated by requirements to move sensitive data to different databases. There is a need for a database in which two related sensitive and non-sensitive data that should belong to the same table remain together in the same manner, thus enabling seamless search and other indexing operations.

Further, since migration of the database whenever there is a platform upgrade is costly and greatly affects the user experience, there is a need for a new technique for data to work seamlessly irrespective of upgrade. The new technique should be equipped to plug and play different DB cell encoders/decoders, based on the encoding type of the data.

Accordingly, the present disclosure is provided to address these needs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for operating a relational database using column wise encryption.

The present disclosure provides Enhanced database support that enables co-existence of sensitive and non-sensitive data without reducing the current capability but making sure the sensitive data is not read when encryption keys are absent. As well achieving all these without compromising on both performance and seamless migration on platform upgrade.

In accordance with an aspect of the present disclosure, a method of operating a relational database (DB) is provided. The method includes determining a sensitivity classification for a column of a table in the DB, performing encryption, using a data encryption key (DEK), of sensitive data when writing the sensitive data to the column determined to be sensitive, performing decryption, using the DEK, of the encrypted sensitive data when reading the sensitive data from the column determined to be sensitive, and performing writing to the column and reading from the column of unencrypted non-sensitive data when the column is determined to be non-sensitive.

In accordance with another aspect of the present disclosure, an apparatus operating a relational DB is provided. The apparatus includes a storage configured to store the DB, a cache, and a controller comprising an engine configured to read from and write to the DB. The engine comprises a structured query language (SQL) statement processing layer, a byte code processing layer, a record processing layer, and a page processing layer. The controller is configured to determine a sensitivity classification for a column of a table in the DB, perform encryption, using a data encryption key (DEK), of sensitive data when writing the sensitive data to the column determined to be sensitive column, perform decryption, using the DEK, of the encrypted sensitive data when reading the sensitive data from the column determined to be sensitive, and perform writing to the column and reading from the column of unencrypted non-sensitive data when the column is determined to be non-sensitive.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
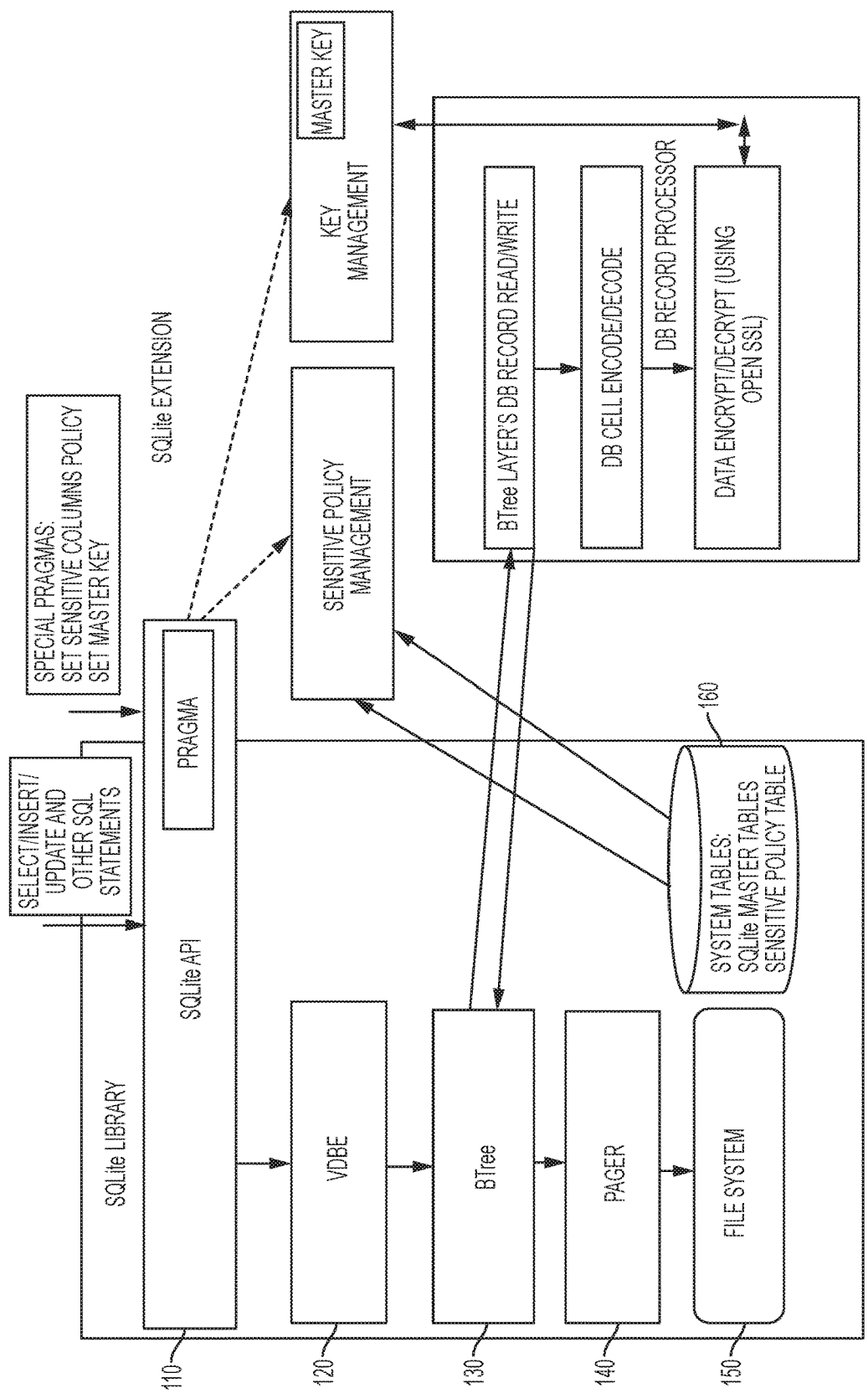
FIG. 1 illustrates a sensitive database (DB) architecture according to an embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, an electronic device may include communication functionality. For example, an electronic device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a Digital Video Disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., Magnetic Resonance Angiography (MRA) device, a Magnetic Resonance Imaging (MRI) device, Computed Tomography (CT) device, an imaging device, or an ultrasonic device), a navigation device, a Global Positioning System (GPS) receiver, an Event Data Recorder (EDR), a Flight Data Recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Various embodiments of the present disclosure include an apparatus and method for allowing a device to access database securely across multiple database cell encoders.

FIG. 1 illustrates a sensitive database (DB) architecture according to an embodiment of the present disclosure.

Referring to FIG. 1, a sensitive relational DB architecture includes an engine configured to read from and write to the DB. The engine includes a statement processing layer 110 (e.g., an SQLite application program interface (API)); a byecode processing layer 120 (e.g., a virtual DB engine (VDBE)); a record processing layer 130 (e.g., a balanced tree (BTree) layer); and a page processing layer 140 (e.g., pager layer). The DB is stored in a file system 150. System tables 160 maintain information regarding the files, including SQLite master tables, sensitive policy table, etc.

In general, a structured query language (SQL) statement is received in the SQLite API 110. The statements are parsed and converted to virtual machine byte codes. The byte codes are executed by the VDBE for various column manipulations or processing by the record processing layer 130. In this process, the table records are constructed and saved or read and processed and returned to applications. The BTree is a mechanism for managing key-value pairs in an efficient manner, although the present disclosure is not limited thereto.

Figure 3:
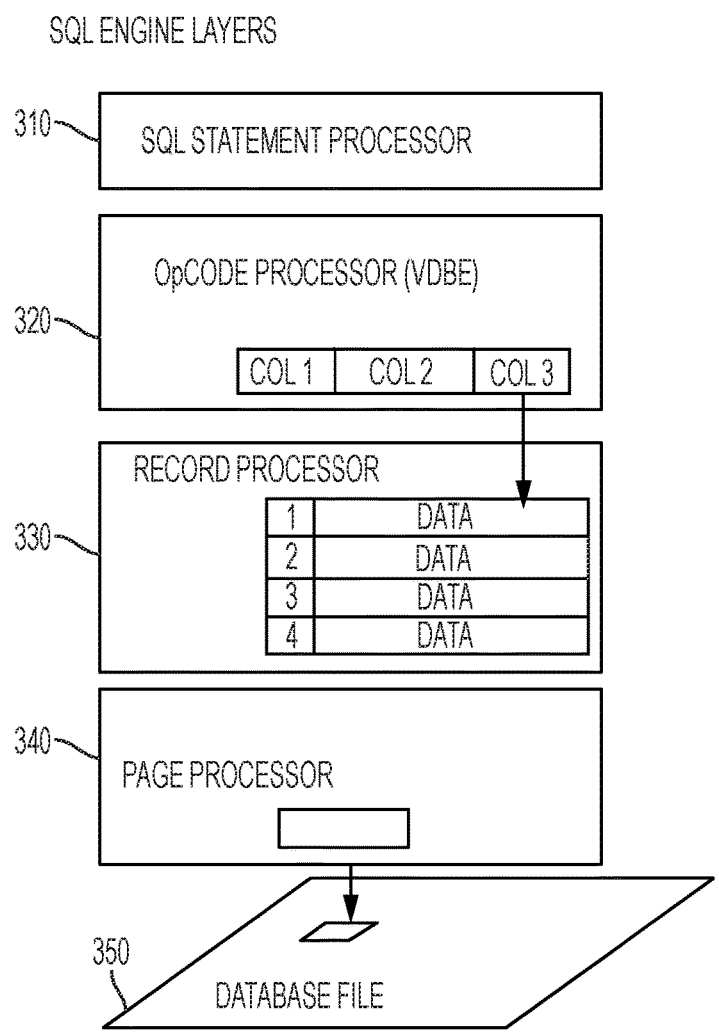
FIG. 3 illustrates layers of a DB engine according to embodiments of the present disclosure.

FIG. 3 illustrates layers of a DB engine according to embodiments of the present disclosure.

The operation is depicted more specifically in FIG. 3. An SQL statement processor 310 receives and parses the statement. For example, the statement may involve accessing column 3 of a particular record, i.e., the third field of a record (line) entry in a table. A VDBE 320 executes the byte code and requests the record from a record processor 330. The record processor 330 requests the page from a page processor 340, which in turn accesses the page from database file 350.

Enhanced database support according to the present disclosure enables co-existence of sensitive data encoded by different encoders, without reducing the current capability but enabling the seamless migration on platform upgrade.

Devices require support for storing sensitive data in the database to meet higher security requirements. Sensitive data are data that should be available for usage only when the required keys are furnished by the device for decryption. For example, a database of employee information according to the present disclosure may include columns for both non-sensitive data (e.g., an employee's name) and sensitive data that should be encrypted (e.g., an employee's Social Security Number). In order to enable sensitive data in the database, applications require databases to support column wise encryption. The database requires applications to configure the sensitive columns of the managed tables. Applications that gain higher security shall also benefit from seamless co-existence of sensitive and non-sensitive data in the database without compromising the original capability of the DB engine.

According to an embodiment of the present disclosure, to enable column wise encryption, a DB engine that operates on or uses a record processing layer, e.g., a BTree module, may be enhanced or upgraded to intercept the read and write calls of records to identify sensitive columns and encrypt those sensitive columns.

According to an embodiment of the present disclosure, security apps may require co-existence of sensitive and non-sensitive in the same DB. The DB Engine supports column wise encryption to support the co-existence of sensitive and non-sensitive data. The DB Engine is enhanced to enable column wise encryption. The record processing layer module intercepts and encrypts the necessary column/data to enable the protection of sensitive data. The protection shall be integrated without much cost to performance through caching.

Figure 2:
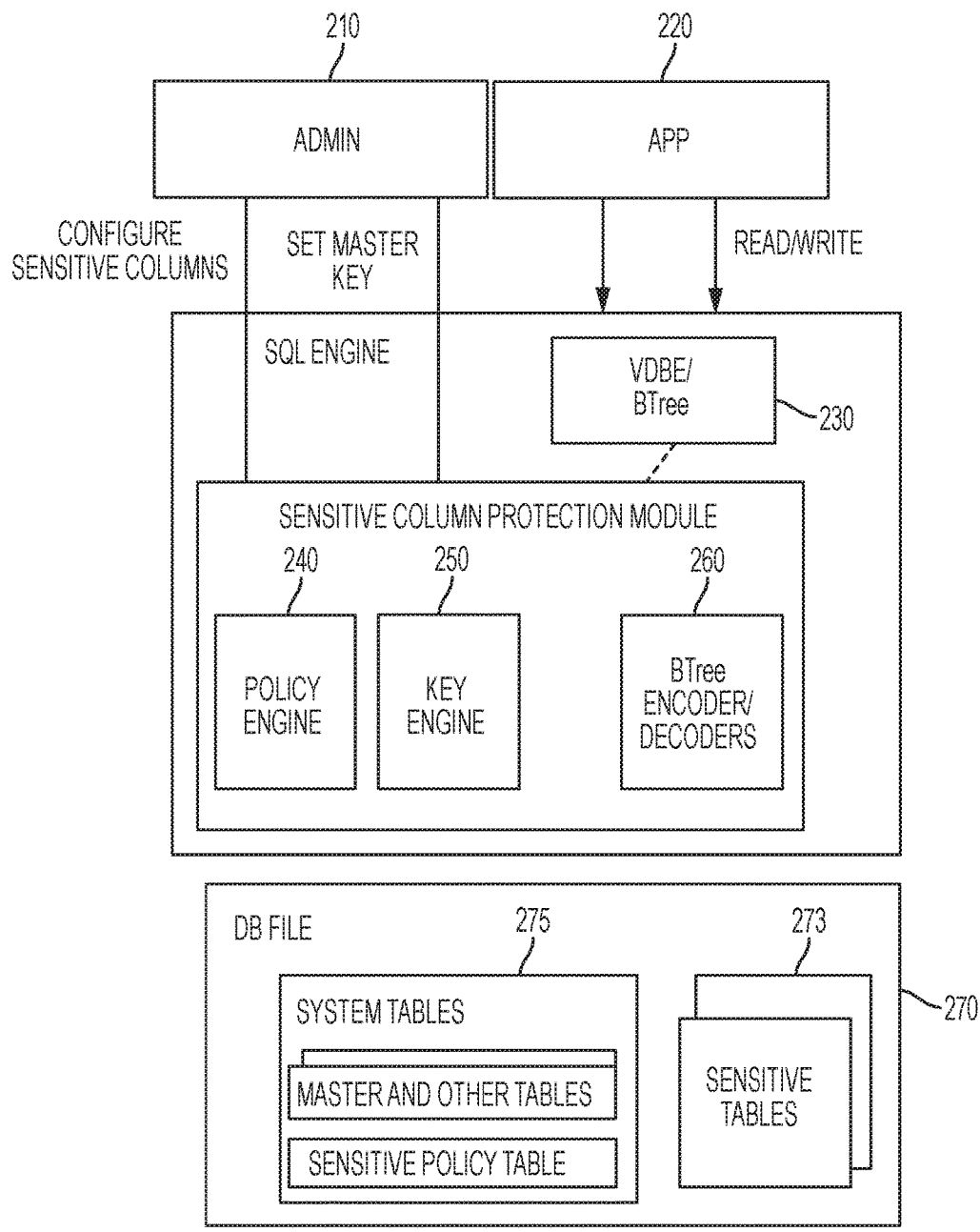
FIG. 2 illustrates an operation of a sensitive DB architecture according to various embodiments of the present disclosure.

FIG. 2 illustrates an operation of a sensitive DB architecture according to various embodiments of the present disclosure.

Referring now to FIG. 2, an admin 210 controls a configuration of the master key and of sensitive columns in the database. Applications 220 may write and read to and from records in a database file 270 according to policy set by the admin 210. The DB file 270 may include sensitive tables 273 having at least one sensitive column, and system tables 275, for example, master tables, sensitive policy table, etc.

The VDBE/BTree 230 collectively comprise a sensitive column protection module in the SQL engine including a policy engine 240, key engine 250, and BTree encoders/decoders 260. The policy engine 240 controls which columns in the DB are protected as sensitive. The key engine 250 keeps Data Encryption Keys (DEKs) for each encrypted data in a sensitive column, on a per cell basis. The key engine 250 only allows access to the DEKs when the master key is provided. The BTree encoders/decoders 260 intercept the record access and will encode/decode the sensitive data of the sensitive column if the corresponding DEK is provided. If the DEK is not provided, then a read operation will return raw encrypted data and a write operation to the sensitive column will fail.

Figure 4:
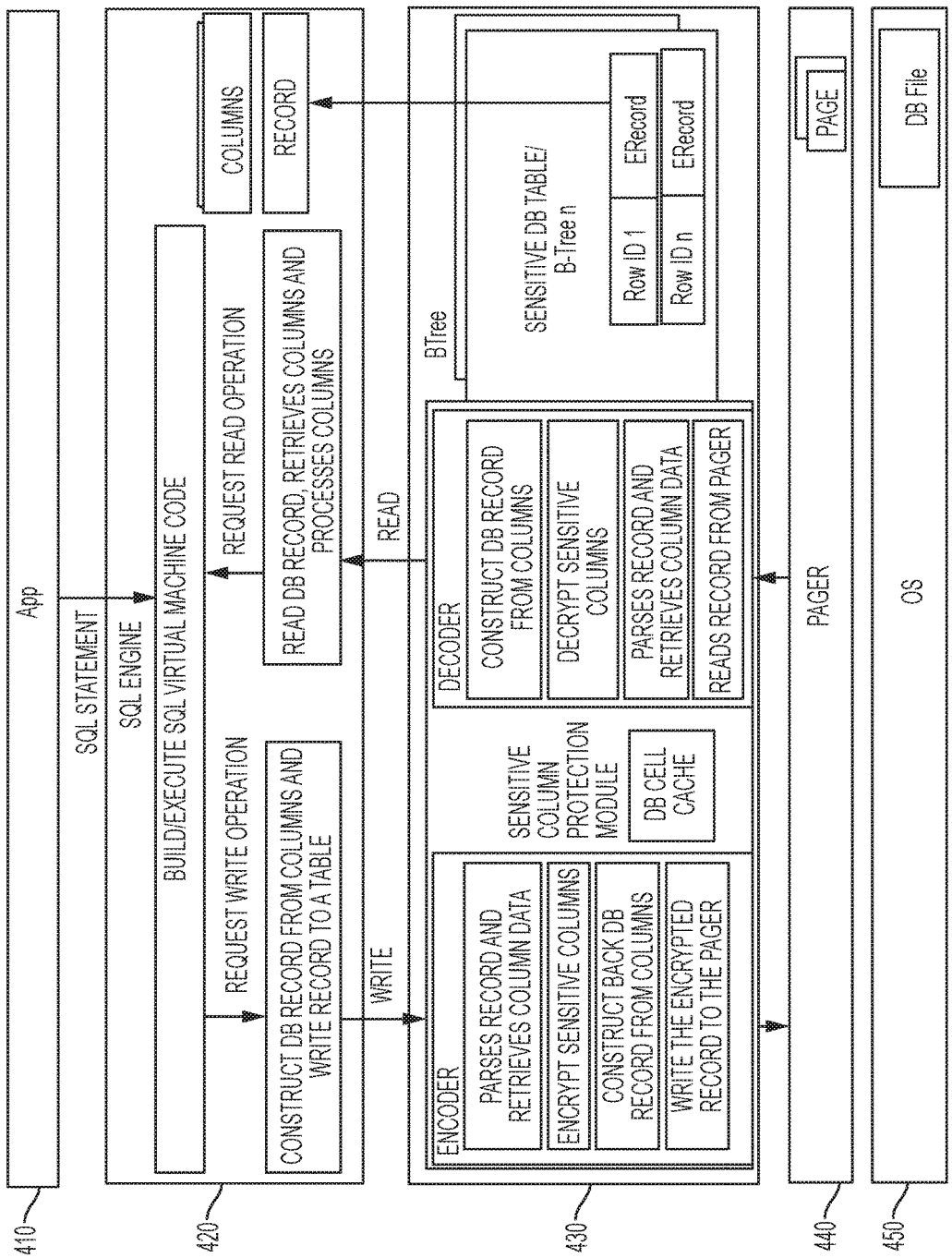
FIG. 4 illustrates a sensitive column protection detailed architecture according to embodiments of the present disclosure.

FIG. 4 illustrates a sensitive column protection detailed architecture in a BTree encoder/decoder according to embodiments of the present disclosure.

Referring to FIG. 4, in a DB engine, structured query language (SQL) statements received from applications 410 are generally parsed and converted to Virtual Machine byte codes, i.e., in a statement processor and a VDBE layer 420. Virtual Machine byte codes are executed by a virtual machine for various column manipulations or processing in the record processing layer 130, i.e., a BTree. In this process the table records are constructed and saved or read and processed and returned to the applications 410. This virtual machine ultimately reads and writes DB table records to the DB file through a BTree 430, a pager 440, and an operating system (OS) 450 and/or file system layers.

Btree is a mechanism for managing key/value pairs. The records that are mediated through BTree are enhanced to interpret and identify the sensitive portion of the record in order to encrypt the necessary columns in the records. This enables column wise encryption for Btree enabled database solutions where these sensitive columns shall be mediated to the DB engine by the applications.

The DB data consistency is generally preserved within the defined transaction states (i.e., the data in memory would not go out of sync with the persistence data till the read/write transaction reaches a commit state). This state requirement is used to enable caching of the decrypted columns in the sensitive column decoder until the transaction reaches the commit state. This reduces the frequency of decryptions of same DB cell within the same transaction.

The present disclosure provides Security enhancement in SQL DB Engine by enabling column wise encryption of sensitive columns, allowing for the co-existence of sensitive and non-sensitive in the same DB and in the same table within the DB.

For those type of SQL DB Engines (such as SQLite) that do DB record management in a layer such as BTree, this enables support for sensitive data management allowing application to configure the sensitive columns for the managed tables and ensuring seamless co-existence of sensitive and non-sensitive data without compromising on the original capability of the DB engine.

By definition, sensitive data are data that shall be available for usage only when the required keys are furnished by the device for decryptions. The key usage shall involve one data encryption key (DEK) per DB Cell and more importantly it also involves usage of one master key to protect the DEKs. The column wise encryption may be on a per-cell basis.

Sensitive columns shall be configured to the DB engine by the applications through a special SQLite API called PRAGMA. A PRAGMA statement is an SQL extension specific to SQLite, and is used to modify the operation of the SQLite library or to query the SQLite library for internal (non-table) data.

The BTree module is identified as the proper place for DB record management in the case of SQLite to intercept and encrypt the necessary column/data, to enable the protection of sensitive data.

The protection is designed to be integrated with current SQL DB Engine without significant cost to the performance through caching.

The solution may also accommodate multiple encoders/decoders to the BTree layer, as the platforms are prone to change when upgraded in the future. As platforms are upgraded, new platforms shall incorporate more efficient or feature rich encoders raising the question on how the old data in the database would be managed.

This capability to support different encoders enables a DB engine to be adaptive to upgrading platform without requiring any data migration. For example, security application developers shall benefit from the seamless co-existence of encoder 'x' encoded sensitive column, and encoder 'y' encoded sensitive column.

That is, this approach enables two related data that should reasonably belong to the same table to remain in the same manner, enabling search and other indexing operations to work seamlessly. The provided solution fulfills the above capability in SQL DB Engine by enhancing the DB record management layer (such as BTree in case of SQLite) to enable column wise encryption.

The DB Engine in an implementation is configured about the sensitive columns by the applications through PRAGMA, but the present disclosure is not limited thereto. In the case of SQLite, BTree module is identified as the proper place to intercept, parse and encrypt/decrypt the necessary column data to enable the protection of sensitive data.

The protection may be integrated with a current SQL DB engine with limited performance impact through caching within a single transaction. A Read/Write transaction in a SQL DB engine goes through different data protection locks to enable consistency on the managed data. These data lock states guarantee a period of time where the data shall not go out of sync by a write transaction. Caching of the decrypted sensitive data within the duration, where the data remain consistent, reaps great benefit to the performance of sensitive table read/write operations. An embodiment may also be equipped to plug and play different DB cell encoders/decoders based on the encoding type of the data.

The below SQL statement enables applications to configure the columns to the SQLite DB engine.

Syntax:
pragma set_sensitive columns ("table=<table-name>; columns=<column 1>, <column 2>, . . . <column n>;");

The configured policy is used by the BTree component in the SQL DB engine to decide which columns are to be encrypted and which not. For example:
pragma set_sensitive_columns ("table=abc; columns=col2,col5;");

DB Record Structure

Figure 5:
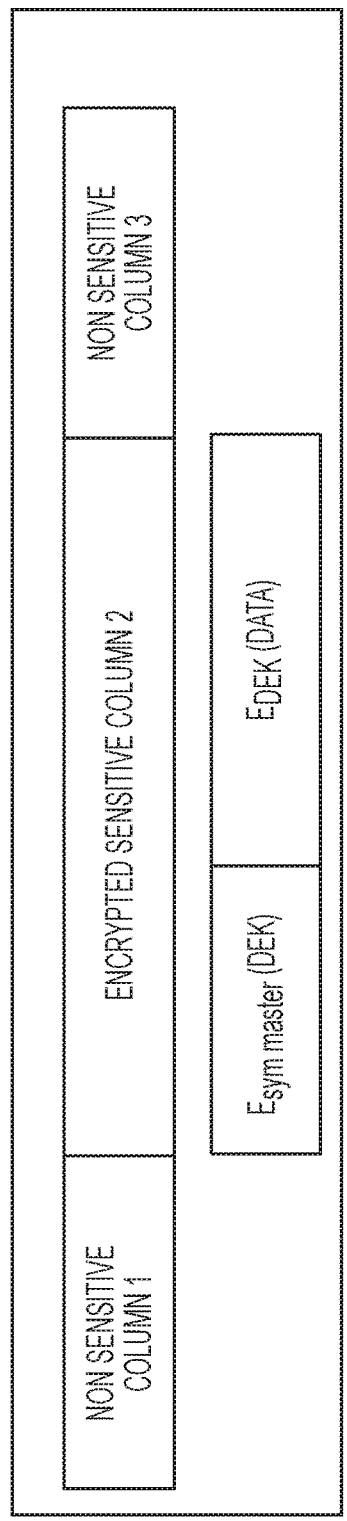
FIG. 5 illustrates an exemplary record structure of data according to embodiments of the present disclosure.

Assume the column 2 is marked as sensitive in table A using the below policy update:
pragma set_sensitive_columns ("table=table_a; columns=col2;");

FIG. 5 illustrates an exemplary record structure of data according to embodiments of the present disclosure. A sensitive column protection module shall use one symmetric master key and one DEK per DB cell as pictorially represented above.

Referring to FIG. 5, assume column 2 is marked as sensitive in the table A using a policy update statement, for example, "pragma set_sensitive_columns ("table=table_a; columns=col2;")." Columns 1 and 3 would then be unencrypted for non-sensitive data, and column 2 is encrypted for sensitive data.

Key Management

1. In an embodiment, every DB cell holds one private key called Data Encryption Key (DEK).

2. In an embodiment, the entire device may hold one master key to protect these private keys.

3. In an embodiment, every DB cell data is encrypted using its own corresponding DEK.

$$EDEK=E_{masterkey}(DEK)$$

4. In an embodiment, the master key is used to encrypt these private DEKs before storing the DEK along with encrypted DB cell data. For example, $$EDATA_{m,n}=E_{DEK}(DATA_{m,n}),$$

where m is the row index and n is the column index.

In an embodiment, read operations may be allowed in managed sensitive tables even when master key is not available, but the read data may be limited to raw encrypted data in the case of absence of the master key.

In an embodiment, the write operations may be completely dependent on the master key presence. That is, write operations may fail in the absence of the master key. The DB may be enabled and equipped to behave in a sensitive mode when the master key is set by admin.

Figure 6:
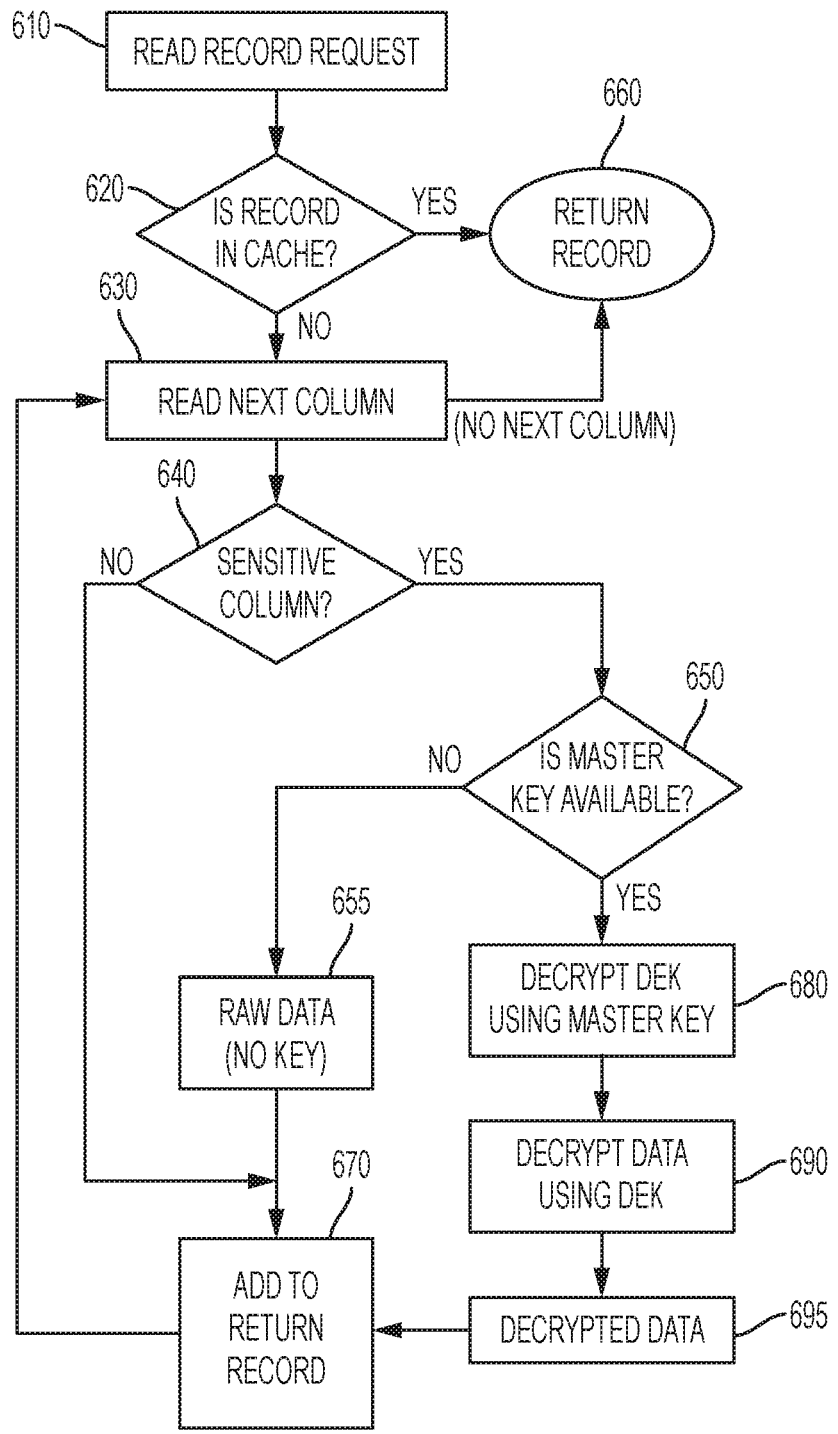
FIG. 6 illustrates an example of a DB read operation according to embodiments of the present disclosure.
Figure 7:
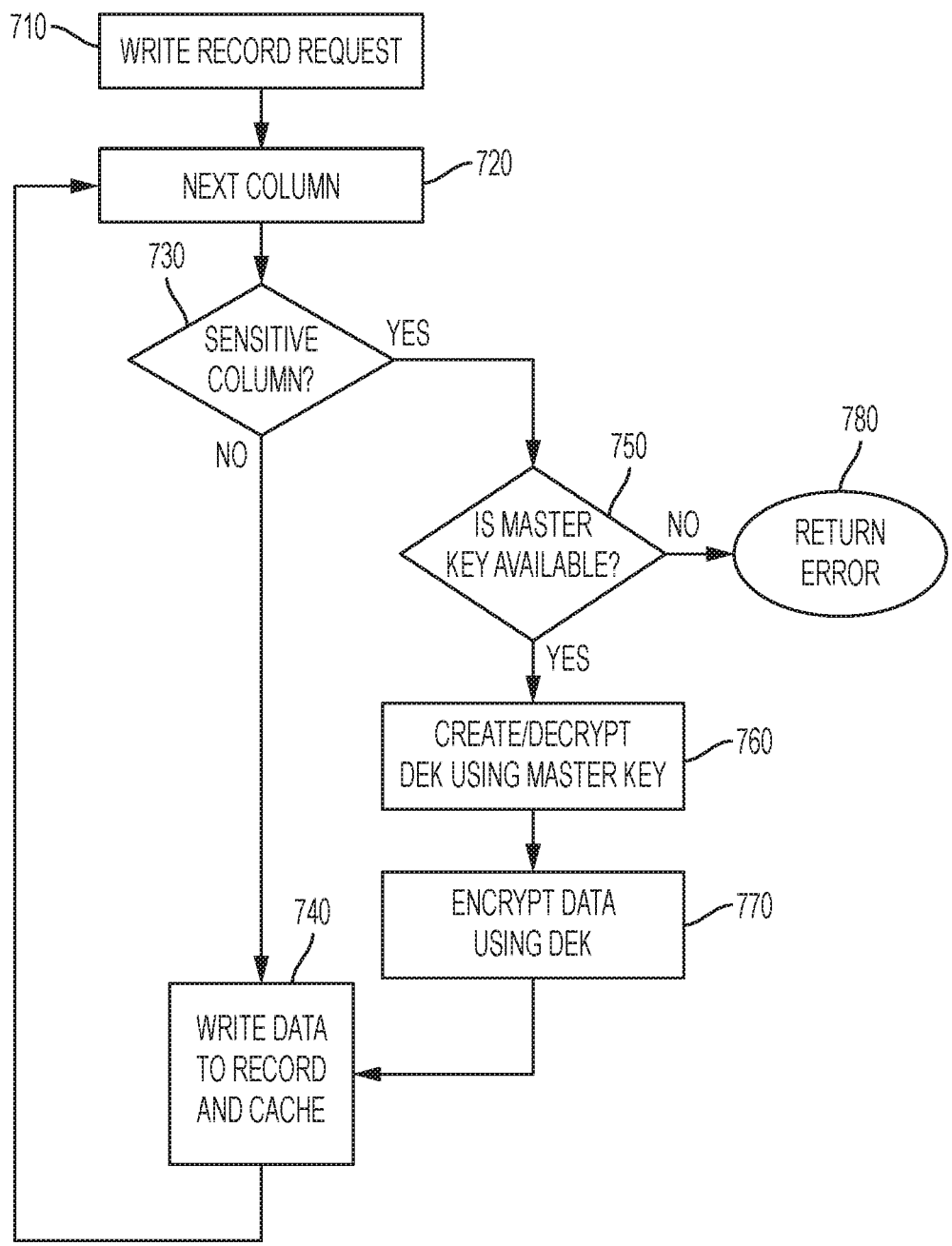
FIG. 7 illustrates an example of a DB write operation according to embodiments of the present disclosure.

FIG. 6 illustrates an example of a DB read operation according to embodiments of the present disclosure. FIG. 7 illustrates an example of a DB write operation according to embodiments of the present disclosure.

Referring to FIG. 6, when a read operation is requested at operation 610, it is first checked at operation 620 whether the requested record is available in cache. If so, the cached record is returned at operation 660. If not, the next column is read at operation 630. If there is no next column, that is, the last column of the record has been checked, then the record is returned at operation 660.

At operation 640 it is checked whether the next column to be read is a sensitive column. If the next column is not sensitive, it is added to the return record at operation 670, and a next column is then read at operation 630.

If the next column is sensitive, however, the data stored therein is encrypted data. It is then checked at operation 650 whether the master key is available to decrypt the data. If the master key is not available, the raw data 655 (i.e., the encrypted data) is added to the return record at operation 670.

If the master key is available, the master key is used at operation 680 to decrypt the corresponding DEK for the column entry, and the decrypted DEK is used at operation 690 to decrypt the data. The decrypted data 695 is added to the return record at operation 670.

It is noted that the decrypted data remains in the cache until a commit state is reached. Thus, the data in memory would not go out of sync with persistent data until the commit state, as discussed below. It is therefore not necessary to check whether a column is sensitive when the record is already in the cache in the decrypted state.

Referring to FIG. 7, a write operation request is handled similarly to the above read operation. A write record request is received at operation 710. A next column to which data is to be written is determined at operation 720. It is checked at operation 730 whether the cell (column) to be written to is in a sensitive column. If the cell is not in the sensitive column, the data is written to the record and cache at operation 740.

If the cell is in the sensitive column, it is checked at operation 750 whether the master key is available. If the master key is not available, an error is returned at operation 780 because there is no decrypted DEK available to write the sensitive data to the sensitive column.

If the master key is available, the master key decrypts the corresponding DEK for the cell at operation 760. If there is not yet a DEK for the cell, a DEK is created for the cell at operation 760. The DEK is used to encrypt the data at operation 770. The encrypted data is then written as final data to the record and the cache at operation 740, and the process proceeds to the next column to be written at operation 720.

It is noted that the data remains in the cache until a commit state is reached. Thus, the data in memory would not go out of sync with persistent data until the commit state, as discussed below.

Figure 8:
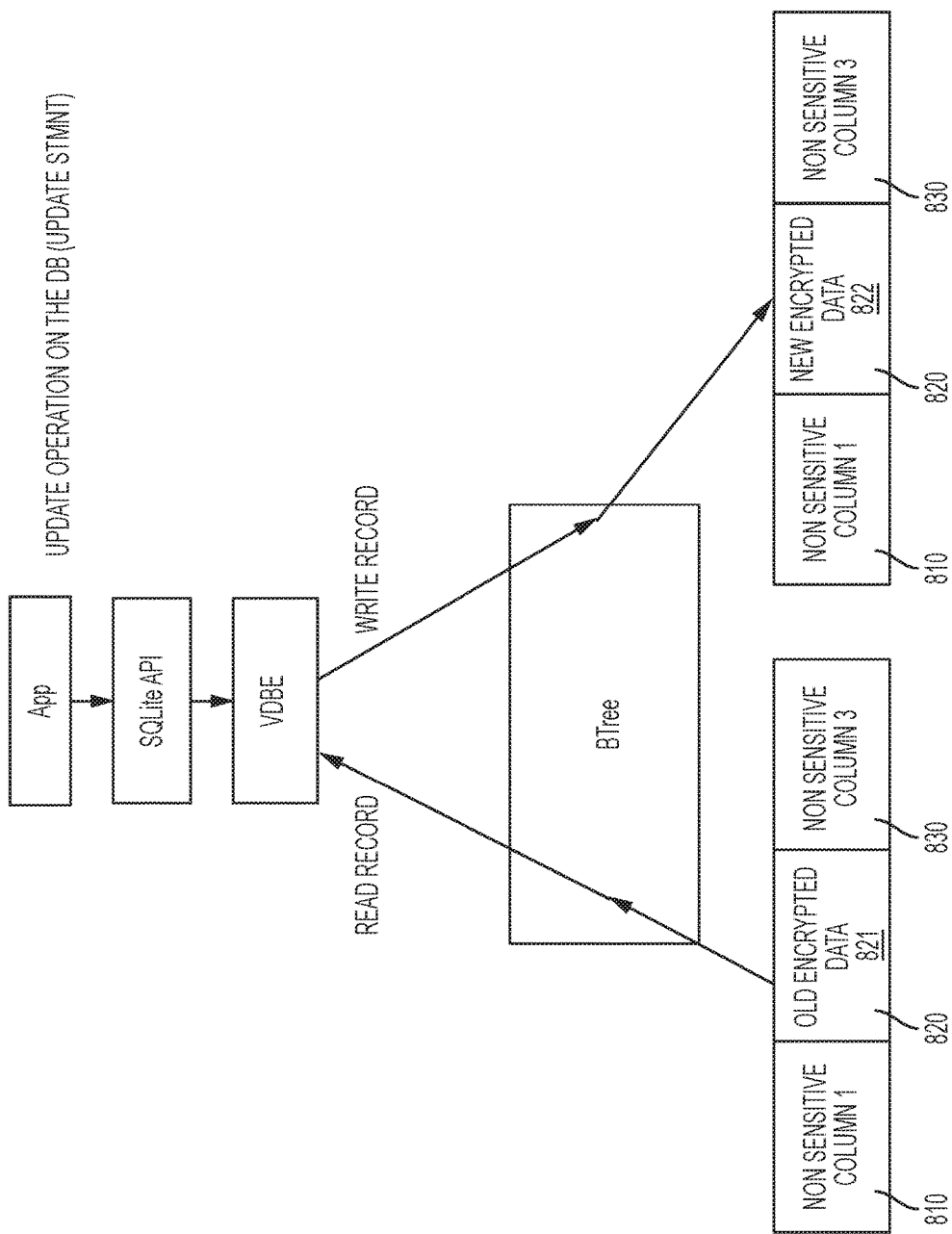
FIG. 8 illustrates an example of a DB update operation according to embodiments of the present disclosure.

FIG. 8 illustrates an example of a DB update operation according to embodiments of the present disclosure.

Referring to FIG. 8, an update operation on the DB is shown (i.e., an update statement is received from an app). In the illustration, non-sensitive column 1 810 and column 3 830 are in a same record as a sensitive column 2 820. The data to be updated is determined to be in a sensitive column 820, thus requiring the corresponding DEK to decrypt and encrypt. To update the data, old encrypted data 821 in the sensitive column 820 is accessed (i.e., decrypted with the corresponding DEK); the data is updated, and the newly updated data is encrypted with the DEK and the new encrypted data 822 is written to the cell in the sensitive column 820. The process is performed with granular support where no encryption or decryption is required for data in non-sensitive columns in the same table. Encryption and decryption are performed on sensitive columns on a per-cell basis.

Indexing

SQL Engine may use an Index table for fast lookup of records. The provided protection module integrates with the BTree layer causing all logics that serve as building blocks of the SQL engine to continue to function the same way as in the traditional flow. The Index table is a table that is implicitly or explicitly manufactured as a combination of columns to be used for loop up. It uses the last column pointing to the record they belong to in the parent table. There are two types of Index tables.

Implicit Index tables are random access memory (RAM) tables which are created and destroyed in RAM itself and do not persist. No sensitivity is attached to these tables.

Explicit Index tables are created by the application like any other others. These are persistent and managed in the DB. Sensitivity migrates from the parent tables to these tables also to avoid sensitive columns being leaked.

To accomplish this, the extension module does not intrude into the algorithm of lookup. Instead, it marks the appropriate columns as sensitive in these Index tables, since the Index tables are maintained in the same way as any other normal tables. That is, when a column is marked as sensitive in the sensitive table using a policy management API, the provided extension module marks the appropriate column in the Index table, which corresponds to the sensitive column in the actual table, as sensitive. When the sensitivity is removed from the parent table, all the index tables are also updated to immediately reflect the same. All other behavior remains the same between the sensitive table and the associated Index table.

Caching of Decrypted Columns

SQLite data consistency is preserved within the defined transaction states, meaning that the data in memory would not go out of sync with the persistence data till the read/write transaction reaches a commit state.

This caching module enables caching of the decrypted columns in the sensitive column decoder until the transaction reaches the commit state.

This enhances the performance of the sensitive columns read by avoiding decryption of these data again and again within the same transaction.

Figure 9:
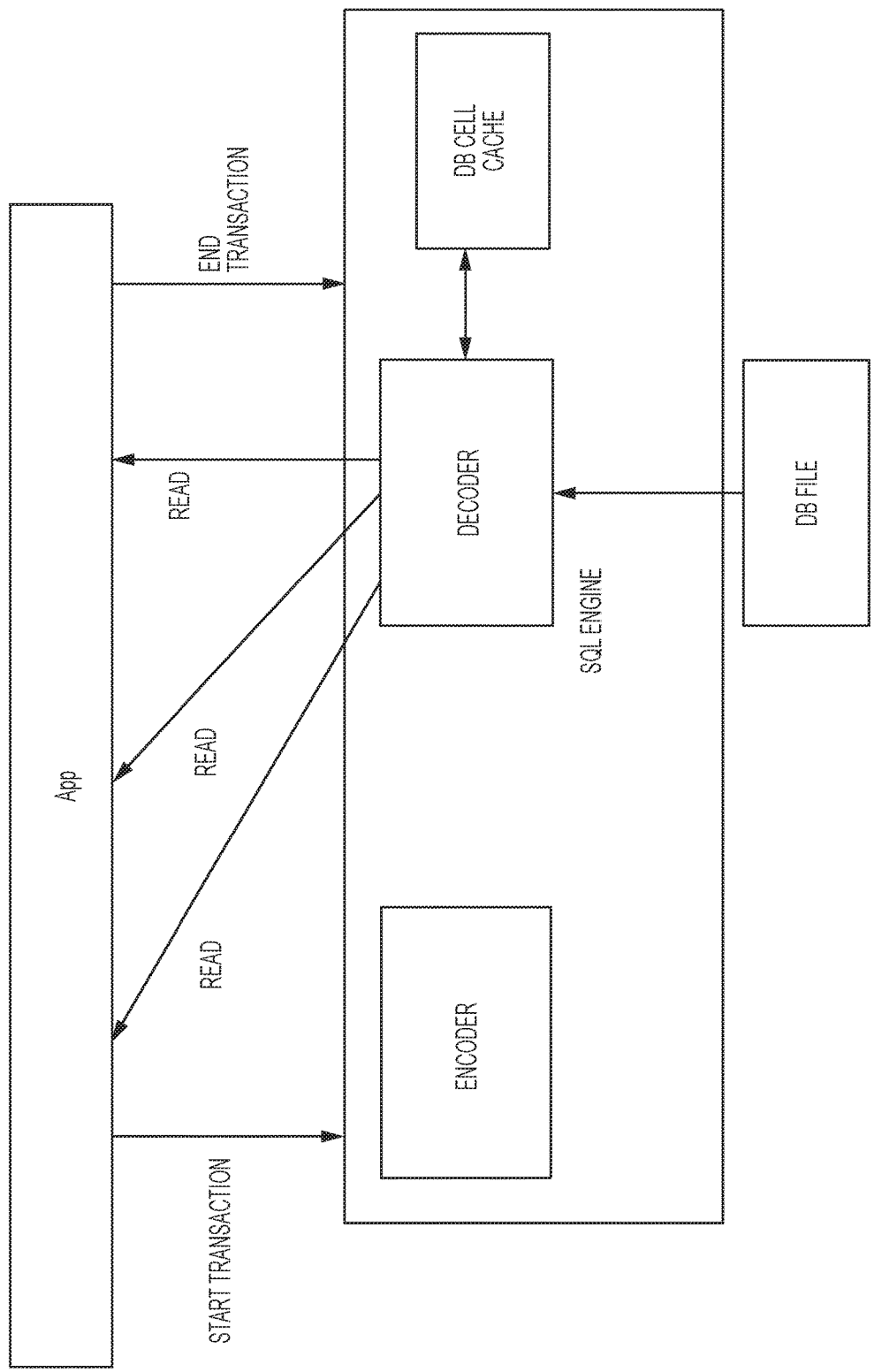
FIG. 9 illustrates an example of caching of decrypted columns according to embodiments of the present disclosure.

FIG. 9 illustrates an example of caching of decrypted columns according to embodiments of the present disclosure.

Referring to FIG. 9, there are depicted the components involved in caching In general, caching can be enabled by:

1. Decrypted Sensitive DB Cells are cached during the active DB transaction.
2. The cache is cleared on End DB transaction.

In FIG. 9, a platform upgrade scenario is illustrated. Btree holds a registry of all the encoders with one selected encoder for future encoding. Encoder Type and related headers are prefixed to all the sensitive data. Before decoding data, the encoder type is identified and the remaining data is then interpreted by appropriate decoder. This adaptability enables the DB engine to be adaptive to upgrading platform without any data migration.

Plug and Play of Column Wise Encoders

Figure 10:
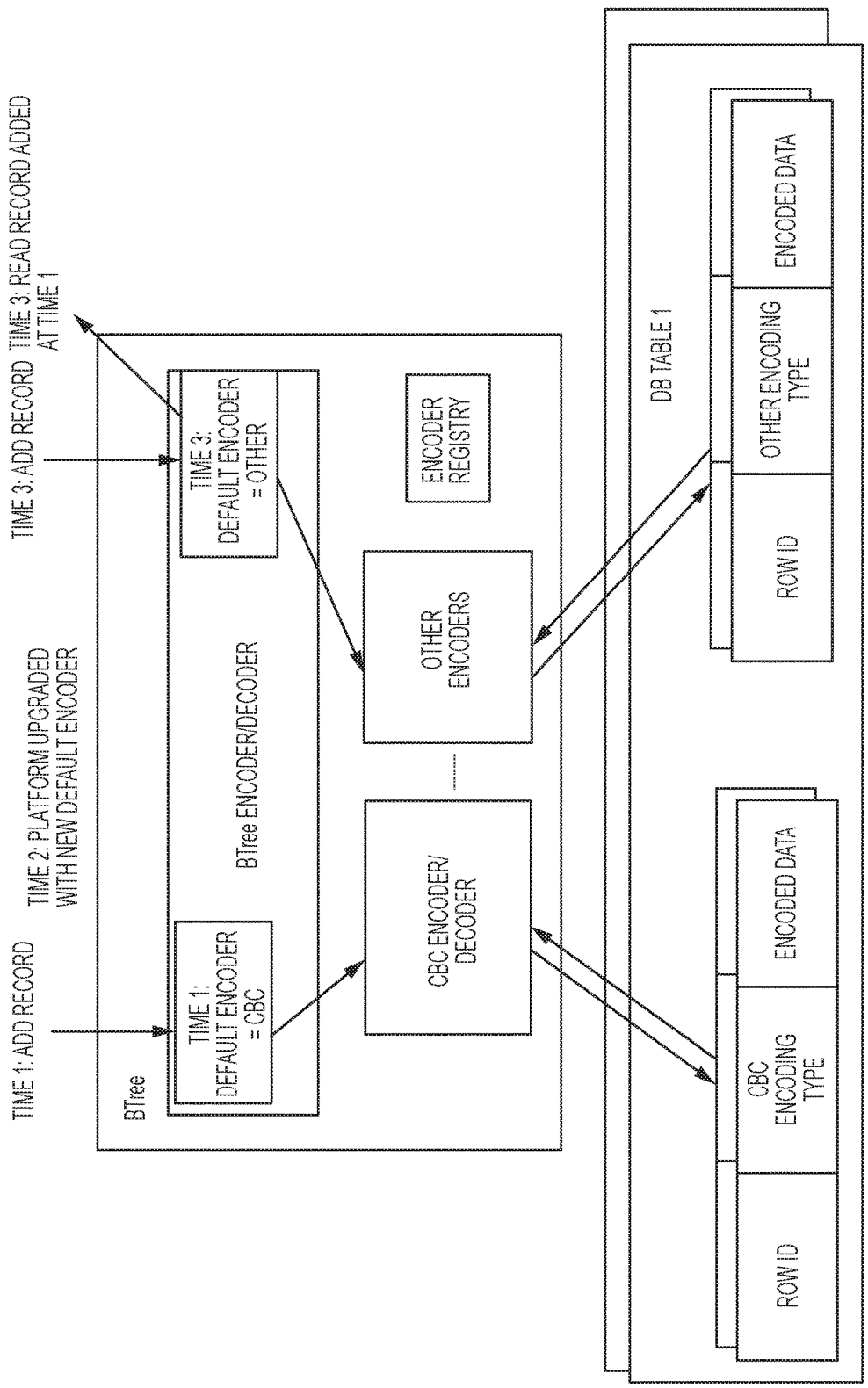
FIG. 10 illustrates a plug and play implementation of multiple encoding types according to embodiments of the present disclosure.

FIG. 10 illustrates a plug and play implementation of multiple encoding types according to embodiments of the present disclosure.

Referring to FIG. 10, a DB software/platform gets migrated during the life cycle of the device. It is possible that the encoding/decoding algorithms such as crypto algorithms shall be upgraded for performance, optimization, and other feature enhancement reasons.

The BTree column wise encoder/decoder module can be enabled with the feature to plug and play different encoders. Exemplary encoders may include, for example, cipher block chaining (CBC) and Galios/counter mode (GCM) Algorithm based encoding. That is, in an embodiment, different default encoders can be used without requiring additional adjustments to integrate them.

Simultaneous support for two or more different encoding types in a single DB table enhances the adaptability of the database across different platform versions during life cycle of the database. This minimizes version migration effort as differently encoded columns can co-exist in a same DB and even in a same table.

Figure 11:
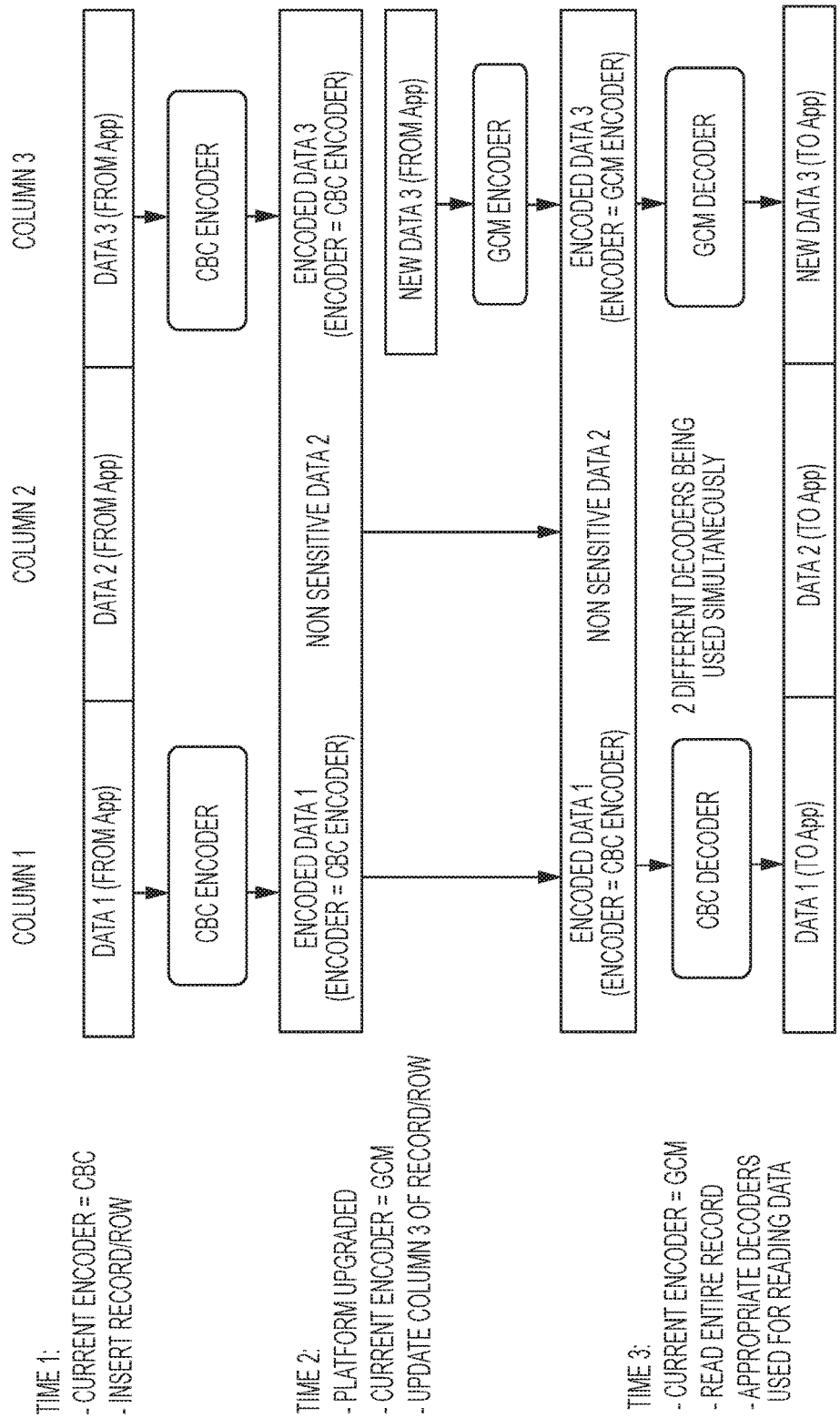
FIG. 11 illustrates an example of encoding and decoding a single table record according to embodiments of the present disclosure.

FIG. 11 illustrates an example of encoding and decoding a single table record according to embodiments of the present disclosure.

Referring to FIGS. 10 and 11, the co-existence of two different encoders simultaneously is illustrated.

An encoder registry may be maintained, i.e., in BTree, tracking which encoder/decoder is used for each sensitive column. If a platform is upgrade, for example, from using a CBC encoder/decoder to another encoder/decoder such as GCM, the upgrade can now be performed seamlessly without requiring migration of the DB.

A current encoder/decoder, e.g., CBC, is used at Time 1 to insert records/rows in a table. For each cell in a sensitive column, it is noted which encoder/decoder is used.

The platform is upgraded at Time 2 to a new encoder/decoder, e.g., GCM.

Data in a sensitive column 3 of a record is updated, using the new encoder/decoder GCM.

When the entire record is read at Time 3, the old CBC decoder is used for sensitive data in sensitive column 1, and the new GCM decoder is used simultaneously for the sensitive data in sensitive column 3.

Figure 12:
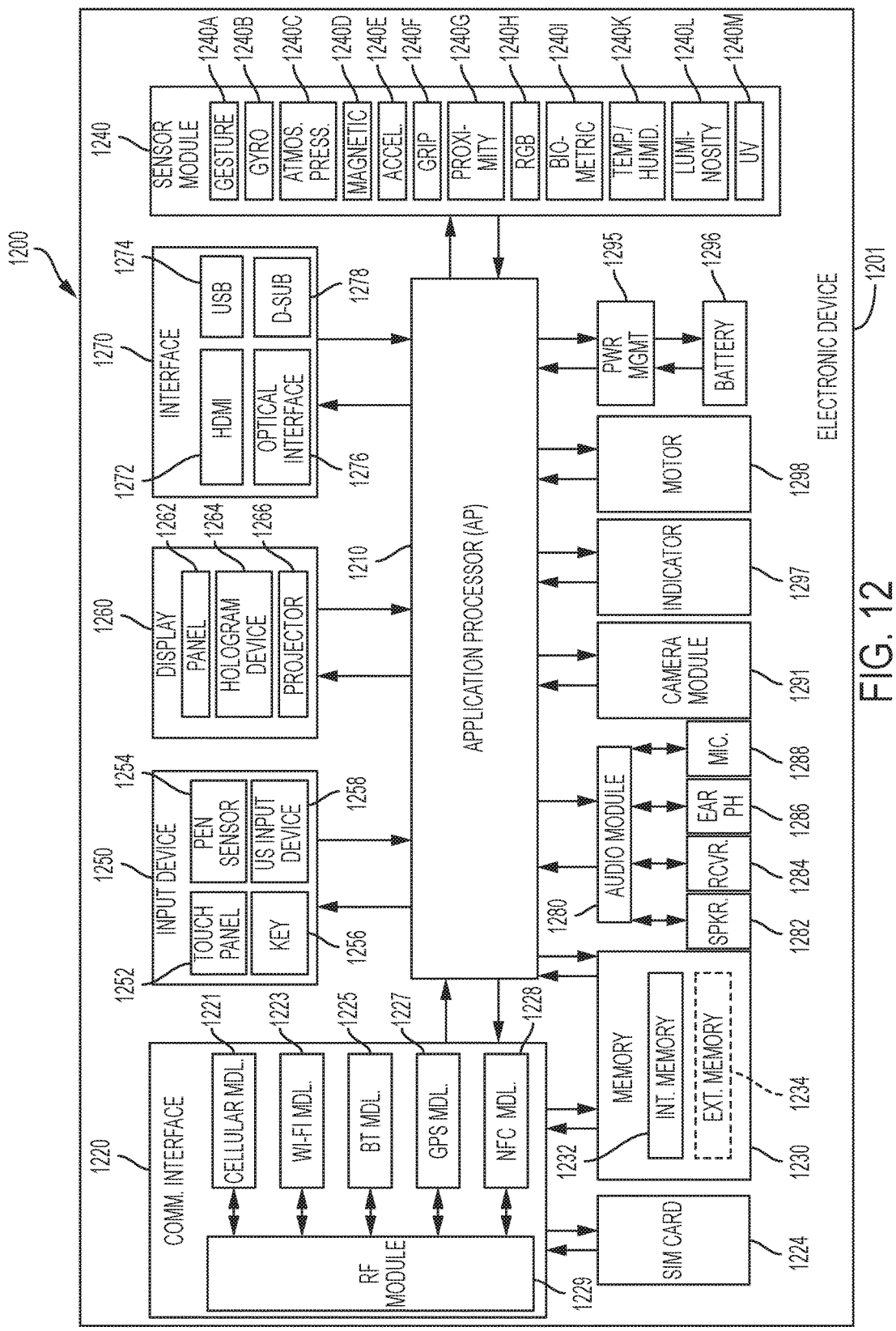
FIG. 12 illustrates a block diagram of hardware according to various embodiments of the present disclosure.

FIG. 12 illustrates a block diagram of hardware according to various embodiments of the present disclosure.

Referring to FIG. 12, hardware 1201 may be, for example, a part or the entire parts of the electronic device 101. Referring to FIG. 12, the hardware 1201 may include one or more Application Processors (AP) 1210, a communication module 1220, a Subscriber Identification Module (SIM) card 1224, a memory 1230, a sensor module 1240, an input module 1250, a display module 1260, an interface 1270, an audio module 1280, a camera module 1291, a power management module 1295, a battery 1296, an indicator 1297, a motor 1298, and/or the like.

The AP 1210 may control one or more hardware or software components that are connected to AP 1210, perform processing or computation of data (including multimedia data), and/or the like. As an example, the AP 1210 may be implemented as a System-on-Chip (SoC). The AP 1210 may include a Graphics Processing Unit (GPU) (not shown).

The communication module 1220 (e.g., the communication interface 160) may transmit and receive data in communications between the electronic device 101 and other electronic devices (e.g., the electronic device 104, the server 106, and/or the like). As an example, the communication module 1220 may include one or more of a cellular module 1221, a Wi-Fi module 1223, a Bluetooth module 1225, a GPS module 1227, a NFC module 1228, a Radio Frequency (RF) module 1229, and/or the like.

The cellular module 1221 may provide services such as, for example, a voice call, a video call, a Short Messaging Service (SMS), internet service, and/or the like, via a communication network (e.g., LTE, LTE-A, CDMA, WCDMA, UMTS, WiBro, GSM, and/or the like). As an example, the cellular module 1221 may differentiate and authorize electronic devices within a communication network using a Subscriber Identification Module (SIM) card (e.g., the SIM card 1224). According to various embodiments of the present disclosure, the cellular module 1221 may perform at least a part of the functionalities of the AP 1210. For example, the cellular module 1221 may perform at least a part of multimedia control functionality.

According to various embodiments of the present disclosure, the communication interface 1220 and/or the cellular module 1221 may include a Communication Processor (CP). As an example, the cellular module 1221 may be implemented as SoC.

Although FIG. 12 illustrates components such as the cellular module 1221 (e.g., CP), the memory 1230, the power management module 1295 as components that are separate from the AP 1210, according to various embodiments of the present disclosure, the AP 1210 may include, or be integrated with, one or more of the foregoing components (e.g., the cellular module 1221.

According to various embodiments of the present disclosure, the AP 1210, the cellular module 1221 (e.g., CP), and/or the like, may process instructions or data received from at least one of non-volatile memory or other components by loading in volatile memory. The AP 1210, the cellular module 1221, the communication interface 1220, and/or the like, may store at non-volatile memory at least one of data that is received from at least one of other components or data that is generated by at least one of the other components.

Each of the Wi-Fi module 1223, the Bluetooth module 1225, the GPS module 1227, the NFC module 1228, and/or the like may, for example, include one or more processors that may process data received or transmitted by the respective modules. Although FIG. 12 illustrates the cellular module 1221, the Wi-Fi module 1223, the Bluetooth module 1225, the GPS module 1227, and the NFC module 1228 as separate blocks, according to various embodiments of the present disclosure, any combination (e.g., two or more) of the cellular module 1221, the Wi-Fi module 1223, the Bluetooth module 1225, the GPS module 1227, the NFC module 1228, and/or the like may be included in an Integrated Chip (IC) or an IC package. For example, at least some of the processors corresponding to the respective the cellular module 1221, the Wi-Fi module 1223, the Bluetooth module 1225, the GPS module 1227, the NFC module 1228, and/or the like, may be implemented as a single SoC. For example, a CP corresponding to the cellular module 1221 and a Wi-Fi processor corresponding to Wi-Fi module 1223 may be implemented as a single SoC.

The RF module 1229 may, for example, transmit and receive RF signals. Although not shown, the RF module 1229 may include a transceiver, a Power Amp Module (PAM), a frequency filter, a Low Noise Amplifier (LNA), and/or the like. The RF module 1234 may include one or more components for transmitting and receiving Electro-Magnetic (EM) waves (e.g., in free space or the like) such as, for example, conductors or conductive wires. Although FIG. 12 illustrates that the cellular module 1221, the Wi-Fi module 1223, the Bluetooth module 1225, the GPS module 1227, and the NFC module 1228 are sharing one RF module 1229, according to various embodiments of the present disclosure, at least one of the cellular module 1221, the Wi-Fi module 1223, the Bluetooth module 1225, the GPS module 1227, the NFC module 1228, and/or the like may transmit and receive RF signals via a separate RF module.

The SIM card 1224 may be a card implementing a SIM, and may be configured to be inserted into a slot disposed at a specified location of the electronic device. The SIM card 1224 may include a unique identifier (e.g., Integrated Circuit Card IDentifier (ICCID)) subscriber information (e.g., International Mobile Subscriber Identity (IMSI)), and/or the like.

The memory 1230 (e.g., memory 130) may include an internal memory 1232, an external memory 1234, or a combination thereof.

According to various embodiments of the present disclosure, the internal memory 1232 may be, for example, at least one of volatile memory (e.g., Dynamic Random Access Memory (DRAM), Static Random Access Memory (SRAM) or Synchronous Dynamic Random Access Memory (SDRAM)), non-volatile memory (e.g., One Time Programmable Read Only Memory (OTPROM), Programmable Read Only Memory (PROM), Erasable and Programmable Read Only Memory (EPROM), Electrically Erasable and Programmable Read Only Memory (EEPROM), mask Read Only Memory (ROM), flash ROM, NAND flash memory, NOR flash memory), and/or the like.

According to various embodiments of the present disclosure, the internal memory 1232 may be a Solid State Drive (SSD). As an example, the external memory 1234 may be a flash drive (e.g., Compact Flash (CF drive), Secure Digital (SD), micro Secure Digital (micro-SD), mini Secure Digital (mini-SD), extreme Digital (xD), Memory Stick, and/or the like). The external memory 1234 may be operatively coupled to electronic device 1201 via various interfaces. According to various embodiments of the present disclosure, the electronic device 1201 may include recording devices (or recording media) such as, for example, Hard Disk Drives (HDD), and/or the like.

The sensor module 1240 may measure physical/environmental properties detect operational states associated with electronic device 1201, and/or the like, and convert the measured and/or detected information into signals such as, for example, electric signals or electromagnetic signals. As an example, the sensor module 1240 may include at least one of a gesture sensor 1240A, a gyro sensor 1240B, an atmospheric pressure sensor 1240C, a magnetic sensor 1240D, an accelerometer 1240E, a grip sensor 1240F, a proximity sensor 1240G, an RGB sensor 1240H, a biometric sensor 1240I, a temperature/humidity sensor 1240J, a luminosity sensor 1240K, a Ultra Violet (UV) sensor 1240M, and/or the like. The sensor module 1240 may detect the operation state of the electronic device and/or measure physical properties, and convert the detected or measured information into electrical signals. Additionally or alternatively, the sensor module 1240 may also include, for example, an electrical-nose sensor (not shown), an electromyography (EMG) sensor (not shown), an electroencephalogram (EEG) sensor (not shown), an infrared (IR) sensor (not shown), an eye-scanning sensor (e.g., iris sensor) (not shown), a fingerprint sensor, and/or the like. The sensor module 1240 may also include control circuitry for controlling one or more sensors included therein.

The input module 1250 may include a touch panel 1252, a (digital) pen sensor 1254, a key 1256, an ultrasonic input device 1258, and/or the like.

As an example, the touch panel 1252 may detect touch input using capacitive, resistive, infrared, ultrasonic methods, and/or the like. The touch panel 1252 may also include a touch panel controller (not shown). As an example, a capacitive-type touch panel may detect proximity inputs (e.g. hovering input) in addition to, or as an alternative to, physical touch inputs. The touch panel 1252 may also include a tactile layer. According to various embodiments of the present disclosure, the touch panel 1252 may provide haptic feedback to the user using the tactile layer.

As an example, the (digital) pen sensor 1254 may be implemented using methods identical to or similar to receiving a touch input from a user, or using a separate detection sheet (e.g., a digitizer).

As an example, the key 1256 may be a keypad, a touch key, and/or the like.

As an example, the ultrasonic input device 1258 may be a device configured to identify data by detecting, using a microphone (e.g., microphone 1288), ultrasonic signals generated by a device capable of generating the ultrasonic signal. The ultrasonic input device 1258 may detect data wirelessly.

According to various embodiments of the present disclosure, the electronic device 1201 may receive user input from an external device (e.g., a network, computer or server) connected to the electronic device 1201 using the communication module 1220.

The display module 1260 (e.g., display 150) may include a panel 1262, a hologram device 1264, a projector 1266, and/or the like. As an example, the panel 1262 may be, for example, a Liquid-Crystal Display (LCD), an Active-Matrix Organic Light-Emitting Diode (AM-OLED) display, and/or the like. As an example, the panel 1262 may be configured to be flexible, transparent, and/or wearable. The panel 1262 and the touch panel 1252 may be implemented as a single module. The hologram device 1264 may provide a three-dimensional image. For example, the hologram device 1264 may utilize the interference of light waves to provide a three-dimensional image in empty space. The projector 1266 may provide image by projecting light on a surface (e.g., a wall, a screen, and/or the like). As an example, the surface may be positioned internal or external to electronic device 1201. According to various embodiments of the present disclosure, the display module 1260 may also include a control circuitry for controlling the panel 1262, the hologram device 1264, the projector 1266, and/or the like.

The interface 1270 may include, for example, one or more interfaces for a High-Definition Multimedia Interface (HDMI) 1272, a Universal Serial Bus (USB) 1274, a projector 1276, or a D-subminiature (D-sub) 1278, and/or the like. As an example, the interface 1270 may be part of the communication interface 1220. Additionally or alternatively, the interface 1270 may include, for example, one or more interfaces for Mobile High-definition Link (MHL), Secure Digital (SD)/MultiMedia Card (MMC), Infrared Data Association (IrDA), and/or the like.

The audio module 1280 may encode/decode sound into electrical signal, and vice versa. According to various embodiments of the present disclosure, at least a portion of audio module 1280 may be part of the I/O interface 140. As an example, the audio module 1280 may encode/decode voice information that is input into, or output from, the speaker 1282, the receiver 1284, the earphone 1286, the microphone 1288, and/or the like.

The camera module 1291 may capture still images and/or video. According to various embodiments of the present disclosure, the camera module 1291 may include one or more image sensors (e.g., front sensor module, rear sensor module, and/or the like) (not shown), an Image Signal Processor (ISP) (not shown), or a flash (e.g., Light-Emitting Diode (flash LED), xenon lamp, and/or the like) (not shown).

The power management module 1295 may manage electrical power of the electronic device 1201. Although not shown, the power management module 1295 may include, for example, a Power Management Integrated Circuit (PMIC), a charger Integrated Circuit (charger IC), a battery gauge, a fuel gauge, and/or the like.

As an example, the PMIC may be disposed in an integrated circuit or an SoC semiconductor. The charging method for the electronic device 1201 may include wired or wireless charging. The charger IC may charge a battery, may prevent excessive voltage or excessive current from a charger from entering the electronic device 1201, and/or the like. According to various embodiments of the present disclosure, the charger IC may include at least one of a wired charger IC or a wireless charger IC. As an example, the wireless charger IC may be a magnetic resonance type, a magnetic induction type, an electromagnetic wave type, and/or the like. As an example, the wireless charger IC may include circuits such as a coil loop, a resonance circuit, a rectifier, and/or the like.

As an example, the battery gauge may measure a charge level, a voltage while charging, a temperature of battery 1296, and/or the like.

As an example, the battery 1296 may supply power to the electronic device 1201. As an example, the battery 1296 may be a rechargeable battery, a solar battery, and/or the like.

The indicator 1297 may indicate one or more states (e.g., boot status, message status, charge status, and/or the like) of the electronic device 1201 or a portion thereof (e.g., AP 1210). Motor 1298 may convert an electrical signal into a mechanical vibration.

Solenoids 1299 provide a force against a magnet, the force being driven parallel to a surface of the display 1260.

Although not shown, the electronic device 1201 may include one or more devices for supporting mobile television (mobile TV) (e.g., a Graphics Processing Unit (GPU)), and/or the like. The devices for supporting mobile TV may support processing of media data compliant with, for example, Digital Multimedia Broadcasting (DMB), Digital Video Broadcasting (DVB), media flow, and/or the like.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), a Digital Versatile Disc (DVD), a magnetic disk or a magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are noted intended to limit the scope of the present disclosure. Accordingly, the scope of the present disclosure should be understood as to include any and all modifications that may be made without departing from the technical spirit of the present disclosure.

What is claimed is:

1. A method of securely storing and retrieving sensitive and non-sensitive data in a same relational database (DB), the method comprising:
   determining a sensitivity classification for each column of a table in the DB;
   determining a different data encryption key (DEK) corresponding to each cell of a column in the DB, wherein the sensitivity classification of the column is determined to be sensitive;
   encrypting sensitive data using the DEK of a corresponding cell in the column and writing the encrypted sensitive data to the corresponding cell;
   decrypting, using the DEK, the encrypted sensitive data when reading the sensitive data from the corresponding cell in the column; and
   performing writing to and reading from another column of unencrypted non-sensitive data in the DB, wherein the sensitivity classification of the other column is determined to be non-sensitive;
   prefixing an encoder type and related headers to the sensitive data; and
   wherein performing intercepting, parsing, the encrypting, and the decrypting of the data is configured to occur at a record processing layer,
   wherein the encoder type indicates an encryption used to encrypt the sensitive data.

2. The method of claim 1, further comprising using a master key to encrypt and decrypt all DEKs in a device.

3. The method of claim 2, wherein, in the absence of the master key, a read operation returns raw encrypted data of the column.

4. The method of claim 2, wherein, in the absence of the master key, a write to the column is disallowed.

5. The method of claim 1, wherein, if a write operation of the sensitive data to a cell in the column is requested, the sensitive data is encrypted using the DEK corresponding to the cell in the column.

6. The method of claim 1, wherein the table comprises the column and the other column.

7. The method of claim 1, further comprising enhancing records mediated through the record processing layer to interpret and identify sensitive columns in the DB.

8. The method of claim 1, wherein the DB is accessed by an SQLite database engine.

9. The method of claim 1, further comprising caching decrypted sensitive columns in the DB until a transaction reaches a commit state.

10. The method of claim 1, wherein a plurality of sensitive columns in the DB are encrypted using a plurality of different encoding types.

11. An apparatus configured to securely store and retrieve sensitive and non-sensitive data in a same relational database (DB), the apparatus comprising:
   a storage configured to store the DB;
   a cache; and at least one processor comprising an engine configured to read from and write to the DB,
wherein the engine comprises:
a structured query language (SQL) statement processing layer;
a byte code processing layer;
a record processing layer; and
a page processing layer,
wherein the controller is configured to:
determine a sensitivity classification for each column of a table in the DB,
determine a different data encryption key (DEK) corresponding to each cell of a column in the DB, wherein the sensitivity classification of the column is determined to be sensitive,
encrypt sensitive data using the DEK of a corresponding cell in the column and write the encrypted sensitive data to the corresponding cell,
decrypt, using the DEK, the encrypted sensitive data when reading the sensitive data from the corresponding cell in the column, and
perform writing to and reading from another column of unencrypted non-sensitive data in the DB,
wherein the sensitivity classification of the other column is determined to be non-sensitive,
wherein an encoder type and related headers are prefixed to the sensitive data,
wherein the encoder type indicates an encryption used to encrypt the sensitive data, and
wherein the record processing layer is configured to perform intercepting, parsing, the encrypting, and the decrypting of data.

12. The apparatus of claim 11, wherein a master key is used to encrypt and decrypt all DEKs in the apparatus.

13. The apparatus of claim 12, wherein, in the absence of the master key, a read operation returns raw encrypted data of the column.

14. The apparatus of claim 12, wherein, in the absence of the master key, a write operation to the column is disallowed.

15. The apparatus of claim 11, wherein, if a write operation of the sensitive data to a cell in the column is requested, the sensitive data is encrypted using the DEK corresponding to the cell in the column.

16. The apparatus of claim 11, wherein the table comprises the column and the other column.

17. The apparatus of claim 11, wherein records mediated through the record processing layer are enhanced to interpret and identify sensitive columns in the DB.

18. The apparatus of claim 11, wherein the engine comprises an SQLite database engine.

19. The apparatus of claim 11, wherein decrypted sensitive columns in the DB are cached in the cache until a transaction reaches a commit state.

20. The apparatus of claim 11, wherein a plurality of sensitive columns in the DB are encrypted using a plurality of different encoding types.

21. The apparatus of claim 11, wherein the apparatus is a mobile terminal.

22. A non-transitory computer readable storage medium encoded with instructions, executable by a processor, to perform a method comprising:
determining a sensitivity classification for a column of a table in a relational database (DB), wherein the table includes both a column of sensitive data and another column of non-sensitive data;
determining a different data encryption key (DEK) corresponding to each cell of the column in the DB, wherein the sensitivity classification of the column is determined to be sensitive;
encrypting sensitive data using the DEK of a corresponding cell in the column and writing the encrypted sensitive data to the corresponding cell;
decrypting, using the DEK, the encrypted sensitive data when reading the sensitive data from the corresponding cell in the column;
performing writing to and reading from the other column of unencrypted non-sensitive data in the DB, wherein the sensitivity classification of the other column is determined to be non-sensitive;
prefixing an encoder type and related headers to the sensitive data, and
wherein performing intercepting, parsing, the encrypting, and the decrypting of data is configured to occur at a record processing layer,
wherein the encoder type indicates an encryption used to encrypt the sensitive data.

* * * * *